(12) United States Patent
Park et al.

(10) Patent No.: US 7,869,650 B2
(45) Date of Patent: *Jan. 11, 2011

(54) DIGITAL VIDEO SIGNAL PROCESSING APPARATUS AND METHOD FOR COMPENSATING A CHROMINANCE SIGNAL

(75) Inventors: Sung-cheol Park, Seongnam-si (KR); Hyung-jun Lim, Suwon-si (KR); Jae-hong Park, Seoul (KR); Jae-hong Park, Seongnam-si (KR); Heo-jin Byeon, Hwaseong-si (KR); Kyoung-mook Lim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1359 days.

This patent is subject to a terminal disclaimer.

(21) Appl. No.: 11/327,654

(22) Filed: Jan. 9, 2006

(65) Prior Publication Data

US 2006/0188154 A1 Aug. 24, 2006

(30) Foreign Application Priority Data

Jan. 11, 2005 (KR) .................. 10-2005-0002459

(51) Int. Cl.
*G06K 9/00* (2006.01)
*G06K 9/68* (2006.01)

(52) U.S. Cl. .................................... 382/167
(58) Field of Classification Search ............... 382/162, 382/164, 167, 172, 173, 218–220, 260–264; 348/383, 605, 609, 610, 624, 661, 663, 665, 348/667, 669, 670, 711, 712, E9.036; 375/E7.135, 375/E7.166

See application file for complete search history.

(56) References Cited

U.S. PATENT DOCUMENTS

| 3,749,824 | A | * | 7/1973 | Sagishima et al. ........... 348/711 |
| 4,074,321 | A | * | 2/1978 | Miller ........................ 348/665 |
| 4,218,696 | A | * | 8/1980 | Ushio et al. .................. 386/25 |
| 4,371,891 | A | * | 2/1983 | Yost ........................... 348/665 |
| 4,597,007 | A | * | 6/1986 | Reitmeier et al. ........... 348/670 |
| 4,636,841 | A | * | 1/1987 | Moles et al. ................. 348/670 |
| 4,819,062 | A | * | 4/1989 | Dongil et al. ............... 348/668 |
| 4,843,457 | A | * | 6/1989 | Yamagata .................... 348/617 |
| 5,218,450 | A | * | 6/1993 | Nagai et al. ................. 386/70 |
| 5,223,920 | A | * | 6/1993 | Srivastava ................... 348/605 |

(Continued)

FOREIGN PATENT DOCUMENTS

JP 63-082087 4/1988

(Continued)

*Primary Examiner*—Amir Alavi
(74) *Attorney, Agent, or Firm*—Lee & Morse, P.C.

(57) ABSTRACT

A digital video signal processing apparatus and method for compensating a chrominance (C) signal includes receiving the C signal separated from an input video signal and compensating the C signal in at least one dimension thereof to generate a compensated C signal. A comparator may determine whether a portion of a Y signal in the input video signal is present in the C signal. The compensator may compensate the C signal only when the comparator determines a portion of the Y signal is present in the C signal. The comparator may calculate a variation between current C data of the input video signal and adjacent C data and compare the variation to a threshold value.

37 Claims, 8 Drawing Sheets

U.S. PATENT DOCUMENTS

| | | | | |
|---|---|---|---|---|
| 5,225,899 | A | * | 7/1993 | Park .......................... 348/665 |
| 5,808,701 | A | * | 9/1998 | Lee ............................ 348/712 |
| 5,864,371 | A | * | 1/1999 | Nayebi et al. ............... 348/692 |
| 6,288,754 | B1 | * | 9/2001 | Ito ............................. 348/663 |
| 6,504,579 | B1 | | 1/2003 | Scherrer |
| 6,995,804 | B2 | * | 2/2006 | Kwon et al. ................ 348/663 |
| 2006/0176406 | A1 | * | 8/2006 | Park et al. ................... 348/665 |
| 2006/0188154 | A1 | * | 8/2006 | Park et al. ................... 382/167 |

FOREIGN PATENT DOCUMENTS

JP      2001-078222 A      3/2001

* cited by examiner

| +u | +v | −u | −v | +u |
|----|----|----|----|----|
| −u | −v | +u | +v | −u |
| +u | +v | −u | −v | +u |

FIG. 5

| +u | −v | −u | +v | +u |
|----|----|----|----|----|
| +v | −u | −v | +u | +v |
| −u | +v | +u | −v | −u |
| −v | +u | +v | −u | −v |
| +u | −v | −u | +v | +u |

DIGITAL VIDEO SIGNAL PROCESSING APPARATUS AND METHOD FOR COMPENSATING A CHROMINANCE SIGNAL

BACKGROUND OF THE INVENTION

1. Field of the Invention

The present invention relates to a digital video signal processing apparatus. More particularly, the present invention relates to a digital video signal processing apparatus and method for compensating a chrominance signal output from 3-dimensional (3D), Y/C separation in NTSC/PAL (National Television System Committee/Phase Alternation by Line) systems.

2. Description of the Related Art

The display of an NTSC/PAL broadcasting system includes a device for processing a CVBS (Composite Video Blanking Sync) signal, which is a composite of a Y (luminance) signal and a C (chrominance) signal. The C signal is quadrature-amplitude-modulated with a subcarrier frequency $f_{sc}$. Thus, characteristics of the C signal are determined by its frequency and phase. A digital video signal processing apparatus at a receiving stage separates Y and C signals with reference to the characteristics of the C signal and displays an image based on the separated signals.

Figure 1:
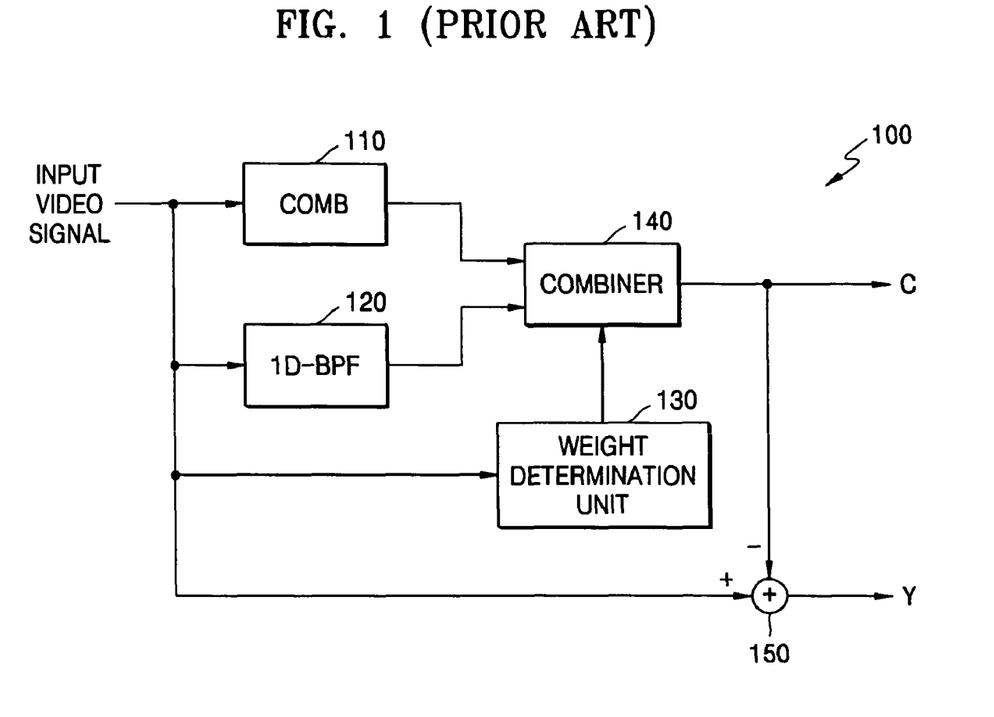
FIG. 1 illustrates a block diagram of a conventional video signal processing apparatus.

FIG. 1 illustrates a block diagram of a conventional video signal processing apparatus 100. Referring to FIG. 1, the video signal processing apparatus 100 includes a comb filter 110, a one-dimensional band pass filter (1D-BPF) 120, a weight decision unit 130, a combiner 140 and a subtracter 150. The comb filter 110 one-dimensionally band-pass-filters an input video signal in the vertical direction. The 1D-BPF 120 one-dimensionally band-pass-filters the input video signal in the horizontal direction. The weight decision unit 130 decides weights of the output of the comb filter 110 and the 1D-BPF 120 with reference to vertical/horizontal correlation and the phase of a C signal. The combiner 140 combines the output signals of the comb filter 110 and 1D-BPF 120, in response to the weights, to output the C signal. The subtracter 150 subtracts the C signal from the input CVBS signal to obtain the Y signal.

Figure 2:
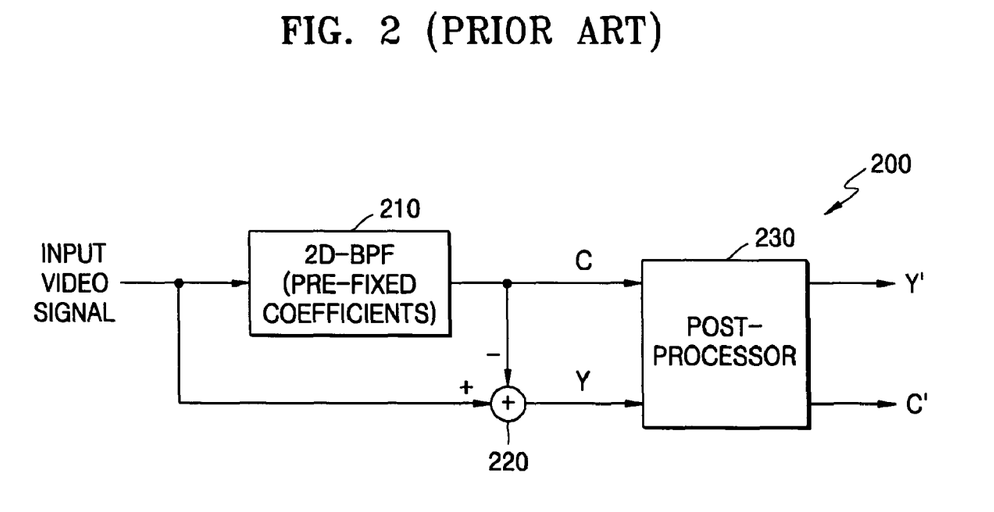
FIG. 2 illustrates a block diagram of another conventional video signal processing apparatus.

FIG. 2 is a block diagram of another conventional video signal processing apparatus 200. Referring to FIG. 2, the video signal processing apparatus 200 includes a 2D-BPF 210, a subtracter 220 and a post-processor 230. The 2D-BPF 210 carries out two-dimensional convolution for extracting a modulated C signal. The extracted C signal and a Y signal output from the subtracter 220 are processed by the post-processor 230. When the 2D-BPF 210 carries out incorrect Y/C separation, the post-processor 230 compensates for this to output a compensated Y/C signal.

In conventional Y/C separation techniques, Y/C separation is performed based on comb filtering when the edge of a detected image has high vertical correlation, but Y/C separation is carried out based on 1D band pass filtering when the detected edge has high horizontal correlation. According to the conventional Y/C separation techniques that select one of the filtering methods, as described above, system performance largely depends on a threshold used for edge detection. That is, Y/C separation can be erroneous or unstable if the wrong filtering method is selected due to inaccuracy of edge detection. Conventional techniques can solve the problem to some extent by not selecting just one of the filtering methods, but instead combining the results of the two filtering operations. However, these techniques are based on horizontal or vertical one-dimensional filtering, and usually cause artifacts when the edge direction is not fixed.

In other words, in the case where the direction of the edge of a general image is not fixed, cross-luma and cross-color can appear on a displayed image when Y/C separation is not properly performed. The cross-luma appears as dotted artifacts generated when a C component exists in the separated Y signal, and the cross-color appears as artifacts in a rainbow pattern generated when a Y component exists in the separated C signal.

To improve spatial filtering, spatio-temporal filtering may be used for a conventional video signal processing apparatus. In this case, the current pixel data is processed using the correlations of pixel data of the previous field and pixel data of the next field with the current pixel, or of the previous frame and the next frame with the current pixel. The spatio-temporal filtering method requires a memory for storing the data of the previous and next fields or frames. Although the spatio-temporal filter is more expensive than the spatial filter, the spatio-temporal filtering technique is frequently used when high quality images are required.

However, even when using the spatio-temporal filtering, there still may be some overlap between the Y and C signals in time and/or space in images that have high frequency components in time and/or space, e.g., moving images. This is a particular problem when a portion of the Y signal is present in the C signal, which may result in cross-color. Human vision is very sensitive to the presence of such cross-color artifacts.

SUMMARY OF THE INVENTION

The present invention is therefore directed to a digital video signal processing apparatus and method, which substantially overcome one or more of the problems due to the limitations and disadvantages of the related art.

It is a feature of an embodiment of the present invention to reduce cross-color in a separated chrominance signal.

It is another feature of an embodiment of the present invention to reduce cross color in at least one dimension.

It is yet another feature of an embodiment of the present invention to reduce cross-color in two spatial dimensions.

It is still another feature of an embodiment of the present invention to reduce cross-color in a temporal dimension.

It is yet another feature of an embodiment of the present invention to determine whether cross-color exists in a separated chrominance signal.

At least one of the above and other features and advantages of the present invention may be realized by providing a method for processing a video signal including receiving a C signal separated from an input video signal and compensating the C signal in at least one dimension.

The method may include determining whether a portion of a Y signal of the input video signal is present in the C signal and performing compensating only when a portion of the Y signal is present in the C signal. The determining may include comparing the input video signal or the separated Y/C signals with a threshold. The comparing may include calculating a variation between the input video signal or the separated Y/C signals and adjacent data and comparing the variation to the threshold. The adjacent data may be temporally and/or spatially adjacent to the current data.

Compensating the C signal may include generating a spatially compensated signal $C_s$. Generating the spatially compensated signal $C_s$ may include calculating coefficients for a filter from spatial weight coefficients, structuring the spatial weight coefficients in the filter in accordance with a format of the input video signal, and convoluting the C signal with the filter. The spatial weight coefficients may be 2D weight coefficients. The 2D weight coefficients may include a first coefficient proportional to vertical and upward correlations with a current pixel, a second coefficient proportional to vertical and downward correlations with the current pixel, a third coefficient proportional to horizontal and leftward correlations with the current pixel, and a fourth coefficient proportional to horizontal and rightward correlations with the current pixel.

The convoluting may include using data in the C signal having a same phase as that of a current pixel. When the input video signal is for use in a PAL system, structuring the 2D weight coefficients may include forming a symmetric matrix.

Compensating for the C signal may include generating a spatially and temporally compensated signal $C_2$ from the spatially compensated signal $C_s$. Generating the spatially and temporally compensated signal $C_2$ may include convoluting the spatially compensated signal $C_s$ with a temporal filter. The temporal filter maybe formed by calculating a backward weight Wb and a forward weight Wf from the input video signal, a preceding video signal and a following video signal, respectively. The backward weight Wb may be proportional to a correlation between a current pixel and a corresponding pixel in a preceding frame and the forward weight Wf may be proportional to a correlation between the current pixel and a corresponding pixel in a following frame.

Generating the spatially and temporally compensated signal $C_2$ may include multiplying data of a current pixel with a current weight Wc, multiplying data of a preceding pixel with backward weight Wb, multiplying data of a following pixel with forward weight Wf, where Wc+Wb+Wf=1, and adding results of the multiplying.

The method may include subtracting the $C_2$ signal from the input video signal.

At least one of the above and other features and advantages of the present invention may be realized by providing an article of manufacture having a machine-accessible medium including data s that, when accessed by a machine, causes the machine to separate an input video signal into a Y signal and a C signal and compensate the C signal in at least one dimension. The machine may also be caused to determine whether a portion of the Y signal is present in the C signal and compensate only when a portion of the Y signal is present in the C signal.

At least one of the above and other features and advantages of the present invention may be realized by providing a a video signal processing apparatus including a compensator to receive a C signal separated from an input video signal and to compensate the C signal in at least one dimension thereof to generate a compensated C signal.

The apparatus may include a comparator to determine whether a portion of the Y signal is present in the C signal, the compensator compensating the C signal only when the comparator determines a portion of the Y signal is present in the C signal.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 10-2005-0002459, filed on Jan. 11, 2005, in the Korean Intellectual Property Office, is incorporated by reference herein in its entirety.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 3:
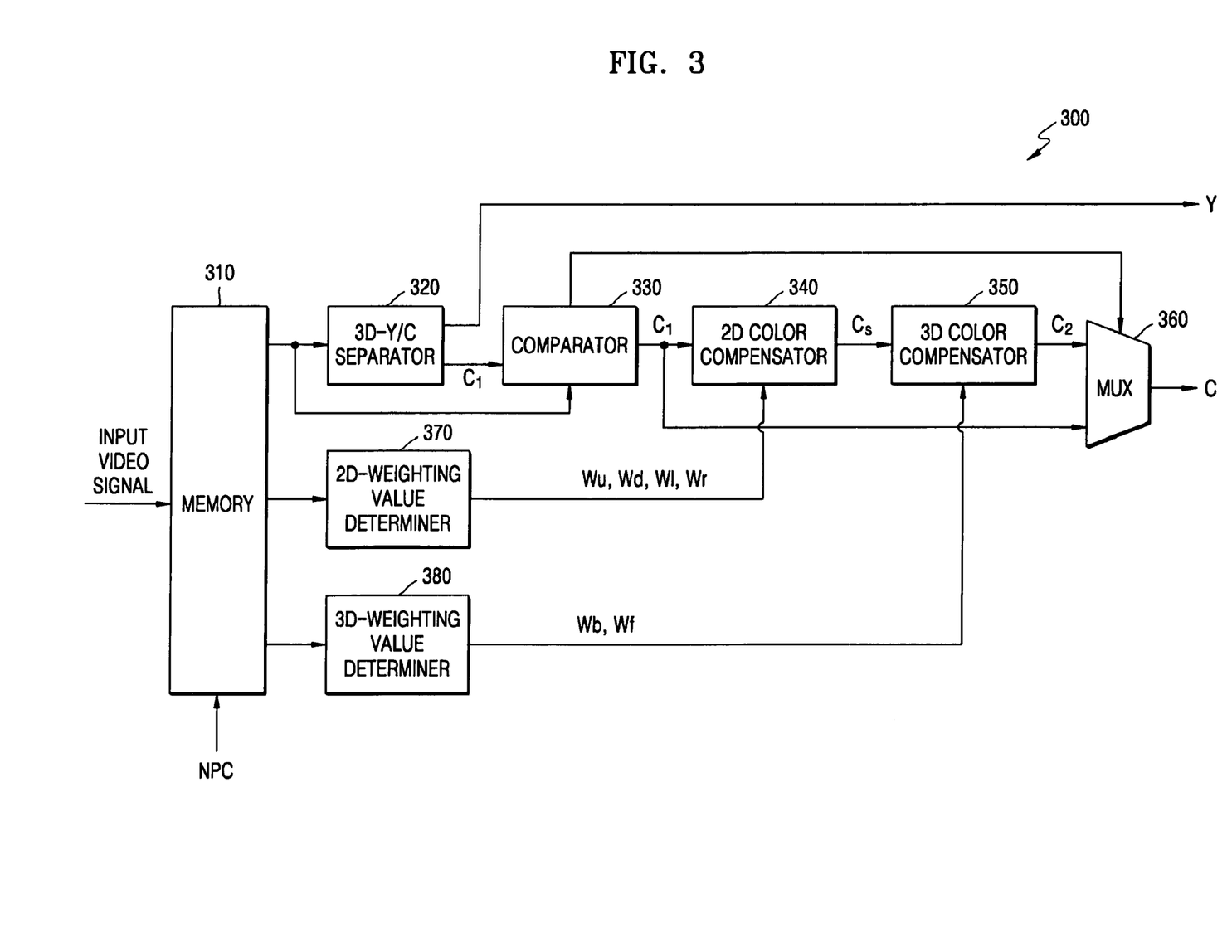
FIG. 3 illustrates a block diagram of a video signal processing apparatus according to an embodiment of the present invention.

FIG. 3 illustrates a block diagram of a video signal processing apparatus 300 according to an embodiment of the present invention. Referring to FIG. 3, the video signal processing apparatus 300 includes a memory 310, a 3D Y/C separator 320, a comparator 330, a 2D color compensator 340, a 3D color compensator 350, a multiplexer (MUX) 360, a 2D weighting value determiner 370 and a 3D weighting value determiner 380. The video signal processing apparatus 300 can be used for both an NTSC system and a PAL system.

The video signal processing apparatus 300 receives a digital CVBS signal as an input video signal and separates the input video signal into a Y signal and a C signal. The input video signal can be a digital signal obtained by sampling the active video region of an analog CVBS signal at a predetermined frequency, e.g., $4f_{sc}$, where $f_{sc}$ is a subcarrier frequency. The subcarrier frequency $f_{sc}$ is different for the NTSC system and the PAL system. A value of a network parameter control (NPC) signal determines data supplied from the memory 310. The memory 310 stores data from the current frame being processed, from the frame before the current frame and from the frame after the current frame.

Figure 4:
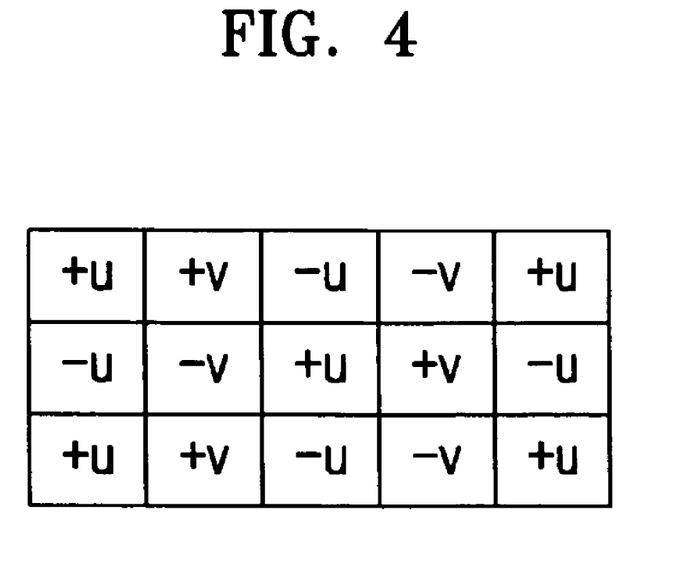
FIG. 4 illustrates chrominance signal phases of an NTSC system.

When the NPC signal has a logic high level, the memory 310 may output data of an NTSC system. An input video signal CVBS(t) of the NTSC system can be represented as follows.

$$CVBS(t)=Y+U^*\sin 2\pi f_{sc}t+V^*\cos 2\pi f_{sc}t, Y,U,V \rightarrow Y(t),U(t),V(t) \quad \text{[Equation 1]}$$

where U and V are C components, $f_{sc}$ is a subcarrier frequency, and t is time. Thus, in the NTSC system, pixel signals sampled at $4f_{sc}$ have chrominance signal phases as illustrated in FIG. 4. That is, the pixel signals are repeated in the form of Y+U, Y+V, Y−U, Y−V, . . . for each horizontal line. FIG. 4 illustrates only the phases of the chrominance signal component. in the NTSC system, the chrominance signal phases are shifted by 180° in neighboring horizontal scan lines, as illustrated in FIG. 4.

Figure 6:
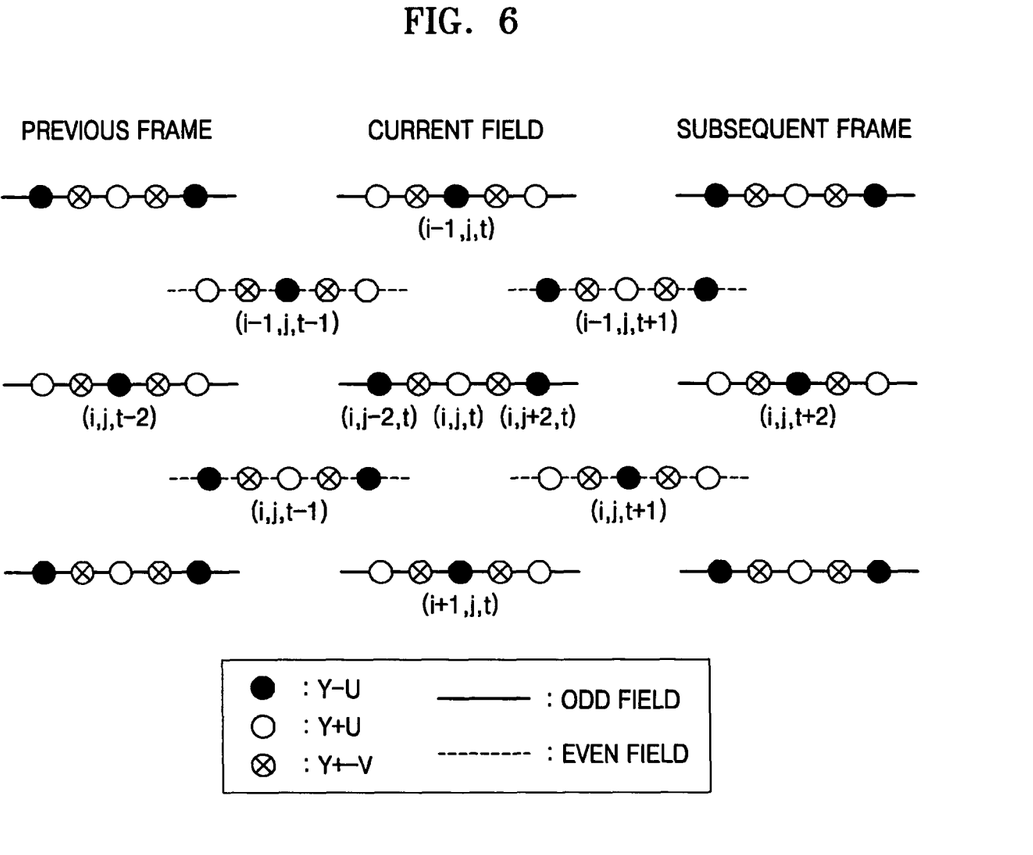
FIG. 6 illustrates spatio-temporal chrominance signal phases of the NTSC system.

The input video signal CVBS(t) of the NTSC system is represented spatio-temporally as illustrated in FIG. 6. Referring to FIG. 6, the phase of the C component of the currently processed central pixel at (i, j, t) has a particular phase, e.g., +U. Pixel signals spatio-temporally disposed in a first diagonal direction from the central pixel, i.e., a pixel at (i−1, j, t+1) of the next field and a pixel at (i, j, t−1) of the previous field, have the same phase as the central pixel. Pixel signals spatio-temporally disposed in a second diagonal direction from the central pixel, i.e., a pixel at (i, j, t+1) of the next field and a pixel at (i−1, j, t−1) of the previous pixel, have a phase opposite the phase, e.g., −U, of the C component of the central pixel at (i, j, t). In the NTSC system, each frame is composed of two fields, i.e., an odd field and an even field.

Figure 5:
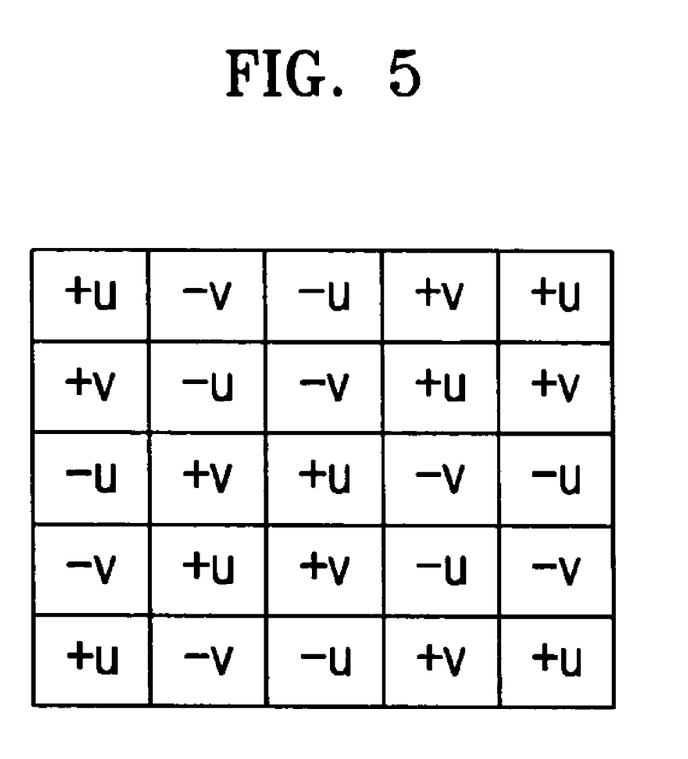
FIG. 5 illustrates chrominance signal phases of a PAL system.

When the NPC signal has a logic high level, the memory 310 may output data of a PAL system. An input video signal CVBS(t) of the PAL system may be represented as follows.

$$CVBS(t)=Y+U^* \sin\ 2\pi f_{sc}t \pm V^* \cos\ 2\pi f_{sc}t,\ Y,U,V \rightarrow Y(t), U(t),V(t) \qquad \text{[Equation 2]}$$

where U and V are C components, $f_{sc}$ is a subcarrier frequency, and t is time. In Equation 2, the sign of the V component alternates between positive and negative every line. Thus, pixel signals in the PAL system have chrominance signal phases as illustrated in FIG. 5. That is, the pixel signals are repeated in the form of Y+U, Y+V, Y−U, Y−V, . . . or Y+U, Y−V, Y−U, Y+V, . . . in each horizontal line, and the chrominance signal phases are shifted by roughly 90° every other horizontal scan line.

Figure 7:
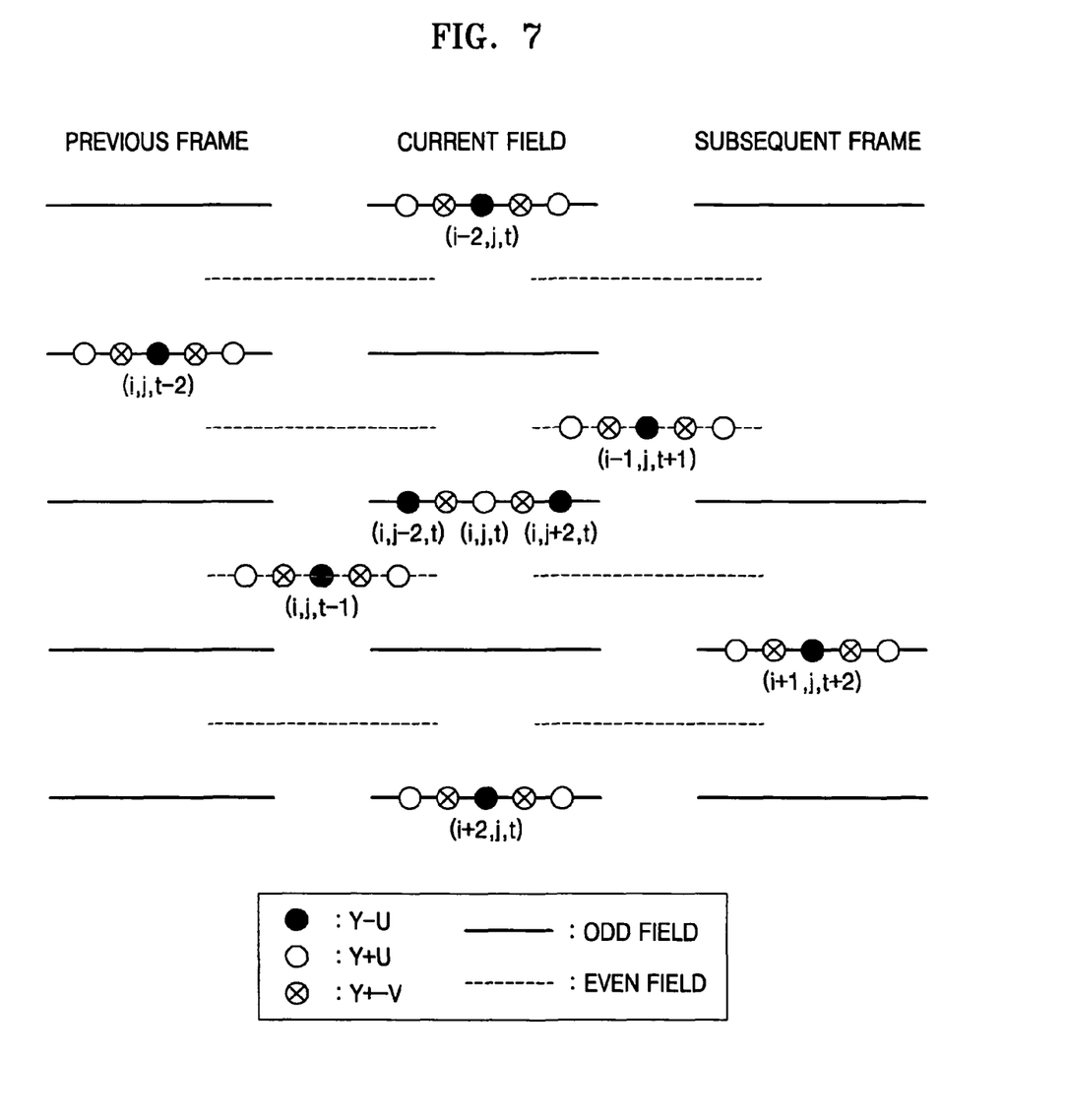
FIG. 7 illustrates spatio-temporal chrominance signal phases of the PAL system.

The input video signal CVBS(t) of the PAL system is represented spatio-temporally, as illustrated in FIG. 7. Referring to FIG. 7, the phase of the C signal component of the currently processed central pixel at (i, j, t) has a particular phase, e.g., +U. Pixel signals spatio-temporally disposed in a diagonal direction from the current pixel, i.e., a pixel at (i−1, j, t+1) of the next field and a pixel at (i, j, t−1) of the previous field, have a phase opposite the phase of the current pixel signal (i, j, t) of the current field. A pixel at (i+1, j, t+2) located one frame (two fields) after the central pixel and a pixel at (i−1, j, t−2) located one frame (two fields) before the central pixel also have the phase opposite the phase of the current pixel at (i, j, t) of the current field. Pixels disposed vertically from the central pixel, i.e., pixels at (i−2, j, t) and (i+2, j, t) of the same field, also have the phase opposite the phase of the current pixel at (i, j, t) of the current field.

The Y and C signals (U and V signals) separated by the video signal processing apparatus 320 may be converted to a format required for an external circuit and then stored or transmitted to a display device. For example, the Y and C signals can be interpolated with three color signals, e.g., red, green and blue color signals, to be displayed on a liquid crystal display (LCD).

Figure 8:
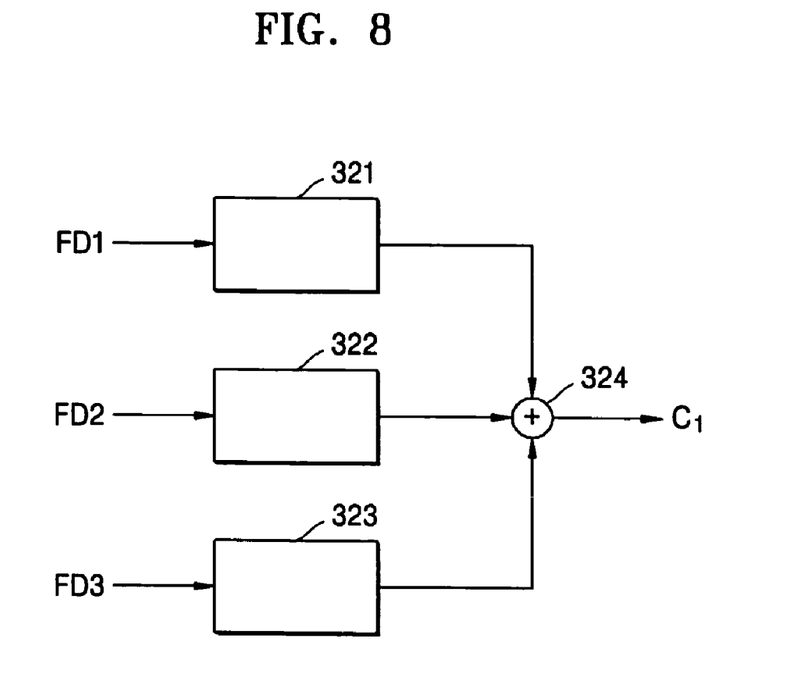
FIG. 8 illustrates an embodiment of a 3D Y/C separator.
Figure 9:
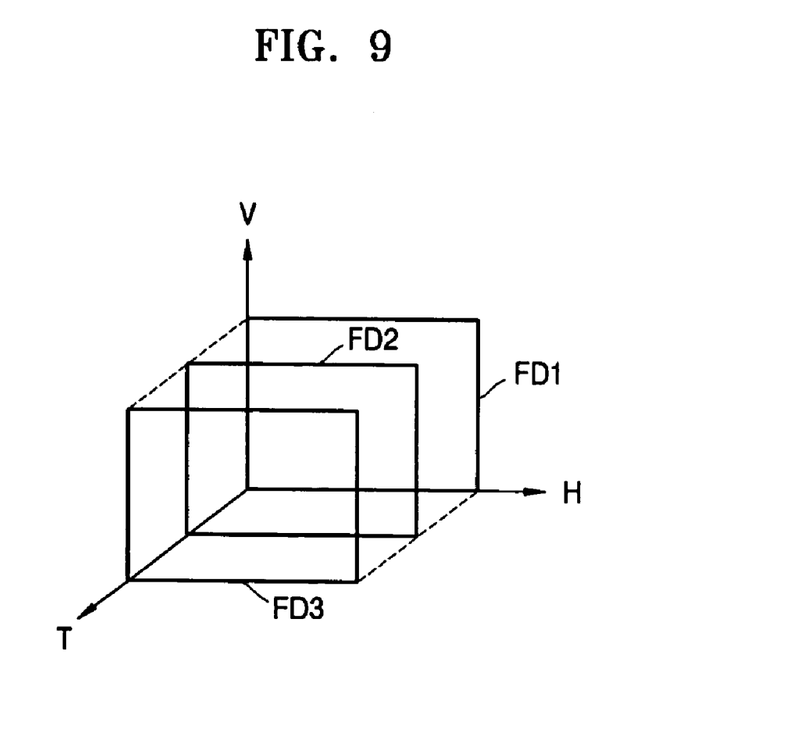
FIG. 9 illustrates a diagram for explaining a 3D filter for use with the 3D Y/C separator of FIG. 8.

As illustrated in FIGS. 8 and 9, the 3D Y/C separator 320 includes three data windows convoluted with three filters. A first window FD1 includes field data for a field before a current field, a second window FD2 includes field data for the current field and a third window FD3 includes field data for a field after the current field. A T1 filter 321 performs a convolution between the first data window FD1 and a first coefficient mask. A T2 filter 322 performs a convolution between the second data window FD2 and a second coefficient mask. A T3 filter 323 performs a convolution between the third data window FD3 and a third coefficient mask. The first through third coefficient masks may be determined in accordance with any appropriate algorithm. A combiner 324 combines the outputs from the first through third filters in accordance with an appropriate algorithm. The 3D Y/C separator 320 outputs a first chrominance signal $C_1$ and a luminance signal Y. Any known 3D Y/C separation technique may be used in accordance with the present invention.

The comparator 330 may determine whether a Y signal is present in the signal $C_1$ output by the 3D Y/C separator 320, using the fact that false color exists in spatial-time varying regions. The comparator 330 may calculate a correlation between a data of the pixel being currently processed in the current field and data which are adjacent to the current pixel in time and space using data from the memory 310. The value of correlation may be obtained by measuring the similarity in time and space. If the correlation is less than a threshold value, the signal $C_1$ may be output to the 2D color compensator 340. If the correlation value is greater than the threshold value, then the signal $C_1$ may be output to the MUX 360. The threshold may be determined in accordance with system requirements and correlation may be an average of all adjacent correlations or may be weighted.

The 2D color compensator 340 may determine a 2D compensated chrominance signal $C_s(i, j)$ using a 2D mask $h_s(i, j)$ and may be represented as follows.

$$C_s(i,j)=h_s(i,j)^{**}C_1(i,j) \qquad \text{[Equation 3]}$$

2D weighting values Wu, Wd, Wl and Wr used to generate the 2D mask $h_s(i, j)$ may be generated by the 2D weighting value determiner 370 with reference to different data output from the memory 310 for the respective NTSC and PAL systems.

For the NTSC system, the 2D mask $h_s(i, j)$ may be represented as follows:

$$h_s(i,j) = \begin{vmatrix} Wu \cdot Wl & 0 & 0 & 0 & 0.5 \cdot Wu & 0 & 0 & 0 & Wu \cdot Wr \\ 0 & 0 & 0 & 0 & 0 & 0 & 0 & 0 & 0 \\ 0.5 \cdot Wl & 0 & 0 & 0 & N & 0 & 0 & 0 & 0.5 \cdot Wr \\ 0 & 0 & 0 & 0 & 0 & 0 & 0 & 0 & 0 \\ Wd \cdot Wl & 0 & 0 & 0 & 0.5 \cdot Wd & 0 & 0 & 0 & Wd \cdot Wr \end{vmatrix} \qquad \text{[Equation 4]}$$

$WuWl, WrWr, WdWl, WdWr \rightarrow 0.25WuWl,$
$0.25WrWr, 0.25WdWl, 0.25WdWr$

For the PAL system, the 2D mask $h_s(i, j)$ may be represented as follows:

$$h_s(i, j) = \begin{vmatrix} Wu \cdot Wl & 0 & 0 & 0 & 0.5 \cdot Wu & 0 & 0 & 0 & Wu \cdot Wr \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0.5 \cdot Wl & 0 & 0 & 0 & N & 0 & 0 & 0 & 0.5 \cdot Wr \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ Wd \cdot Wl & 0 & 0 & 0 & 0.5 \cdot Wd & 0 & 0 & 0 & Wd \cdot Wr \end{vmatrix}$$ [Equation 5]

$WuWl, WrWr, WdWl, WdWr \to 0.25WuWl,$
$0.25WrWr, 0.25WdWl, 0.25WdWr$

In Equations 4 and 5, N, which is applied to the current pixel, may be a normalizing value that ensures that the sum of the absolute values of the coefficients and N is 1. Weights Wu, Wd, Wl and Wr in Equations 4 and 5 may be applied to the pixels having the same phase as that of the central pixel, and have values of between 0 and 1, inclusive, according to local characteristics of an image. Weights WuWl, WdWl, WuWr and WdWr may be applied to the diagonal pixels, also having the same phase as the central pixel.

For the NTSC system, the data window CVBS(i, j) used for convolution by the 2D color compensator 340, represented by Equation 3, may be data corresponding to the matrix of Equation 4. In particular, pixel data corresponding to non-zero elements in Equation 4 may be used for convolution of Equation 3. More particularly, for the NTSC system, N may be applied to the current central pixel (i, j), Wl may be applied to a pixel (i, j−4) located four pixels to the left of the current central pixel, Wr may be applied to a pixel (i, j+4) located four pixels to the right of the current central pixel, Wu may be applied to a pixel (i−2, j) located two horizontal scan lines above the current central pixel and Wd may be applied to a pixel (i+2, j) located two horizontal scan lines below the current central pixel. Further, WuWl may be applied to a pixel (i−2, j−4) located two horizontal scan lines above and four pixels to the left of the current central pixel, WuWr may be applied to a pixel (i−2, j+4) located two horizontal scan lines above and four pixels to the right of the current central pixel, WdWl may be applied to a pixel (i+2, j−4) located two horizontal scan lines below and four pixels to the left of the current central pixel and Wd Wr may be applied to a pixel (i+2, j+4) located two horizontal scan lines below and four pixels to the right of the current central pixel.

For the PAL system, the data window CVBS(i, j) used for convolution by the 2D color compensator 340 represented by Equation 3, may be data corresponding to the matrix of Equation 5. In particular, pixel data corresponding to non-zero elements in Equation 5 may be used for convolution of Equation 3. More particularly, for the PAL system, N may be applied to the current central pixel at (i, j), Wl may be applied to a pixel (i, j−4) located four pixels to the left of the current central pixel, Wr may be applied to a pixel (i, j+4) located four pixels to the right of the current central pixel, Wu may be applied to a pixel (i−4, j) located four horizontal scan lines above the current central pixel and Wd may be applied to a pixel (i+4, j) located four horizontal scan lines below the current central pixel. Further, WuWl may be applied to a pixel (i−4, j−4) located four horizontal scan lines above and four pixels to the left of the current central pixel, WuWr may be applied to a pixel (i−4, j+4) located four horizontal scan lines above and four pixels to the right of the current central pixel, WdWl may be applied to a pixel (i+4, j−4) located four horizontal scan lines below and four pixels to the left of the current central pixel and Wd Wr may be applied to a pixel (i+4, j+4) located four horizontal scan lines below and four pixels to the right of the current central pixel.

Figure 10:
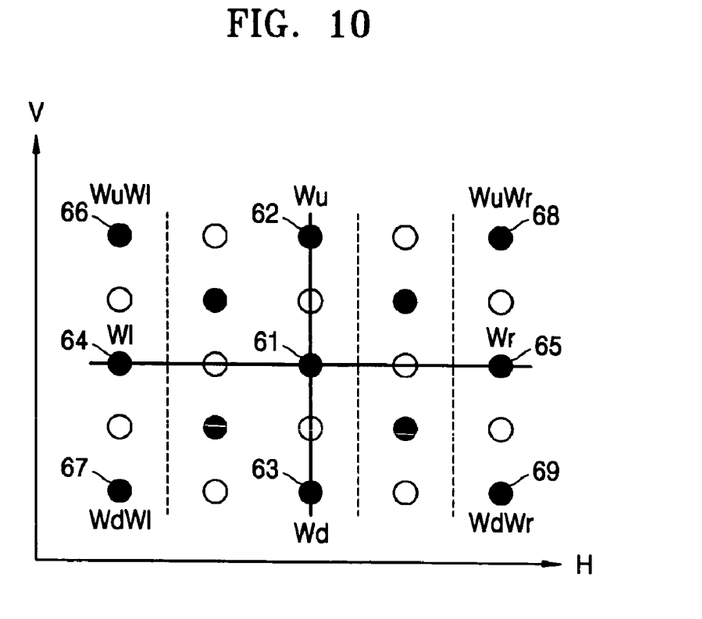
FIG. 10 illustrates a diagram for explaining 2D color compensation.

Pixel data items corresponding to the 2D coefficient mask $h_s(i, j)$ are illustrated in FIG. 10. Data items corresponding to elements composed of nonzero coefficients in the 2D coefficient mask $h_s(i, j)$ in Equation 3, i.e., data items (62, 63, 64 and 65 of FIG. 10) in vertical and horizontal directions, which have the same C component phases to the central pixel (61 of FIG. 10), and pixel data items (66, 67, 68 and 69 of FIG. 10) in diagonal directions, which also have the same C component phases as the central pixel, may be used for the aforementioned convolution.

The 2D coefficients Wu, Wd, Wl and Wr used in Equation 5 may be determined such that they satisfy Equation 6.

$$|Wu| \propto \frac{1}{VARv} (\text{or } VARh) \text{ and } |Wu| \propto \frac{1}{VARu} (\text{or } VARd)$$ [Equation 6]

$$|Wd| \propto \frac{1}{VARv} (\text{or } VARh) \text{ and } |Wd| \propto \frac{1}{VARd} (\text{or } VARu)$$

$$|Wl| \propto \frac{1}{VARh} (\text{or } VARv) \text{ and } |Wl| \propto \frac{1}{VARl} (\text{or } VARr)$$

$$|Wr| \propto \frac{1}{VARh} (\text{or } VARv) \text{ and } |Wr| \propto \frac{1}{VARr} (\text{or } VARl)$$

In Equation 6, VARv is a vertical variation in the input video signal, VARh is a horizontal variation in the input video signal, VARu is an upward variation in the input video signal, VARd is a downward variation, VARl is a leftward variation and VARr is a rightward variation.

In an embodiment of the present invention, Equation 6 may be given by the following.

$$Wu = -0.5 \times \frac{Difh}{Difh + Difv} \times \frac{Difd}{Difu + Difd}$$ [Equation 7]

$$Wd = -0.5 \times \frac{Difh}{Difh + Difv} \times \frac{Difu}{Difu + Difd}$$

$$Wl = -0.5 \times \frac{Difv}{Difh + Difv} \times \frac{Difr}{Difr + Difl}$$

$$Wr = -0.5 \times \frac{Difv}{Difh + Difv} \times \frac{Difl}{Difr + Difl}$$

In Equation 7, Difv is the absolute value of a vertical difference, Difh is the absolute value of a horizontal difference, Difu is the absolute value of an upward difference, and Difd is the absolute value of a downward difference, Difl is the absolute value of a leftward difference and Difr is the absolute value of a rightward difference. Thus, the 2D weights are normalized relative to one another. For example, if Difv is larger than Difh, the vertical weights Wu and Wd will be smaller than the horizontal weights Wl and Wr. Similarly, if Difu is larger than Difd, Wu will be smaller than Wd. All of the weights are between −0.5 and 0.5.

Figure 11:
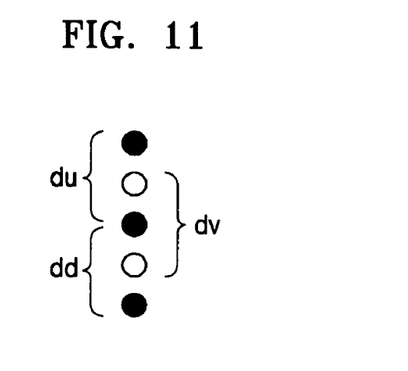
FIG. 11 illustrates a vertical variation in pixels.
Figure 12:
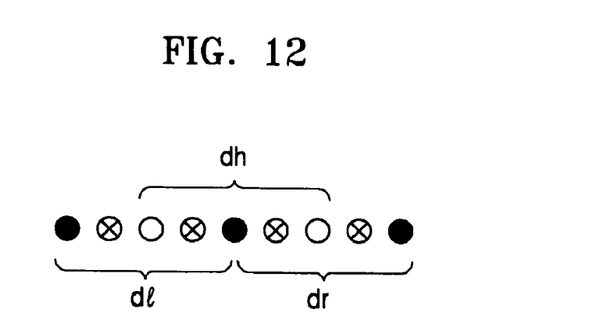
FIG. 12 illustrates a horizontal variation in pixels.

FIGS. 11 and 12 are diagrams for explaining vertical and horizontal variations in pixels of the NTSC system. Referring to FIG. 11, for example, Difv=du+dd+dv, Difu=du and Difd=dd. Referring to FIG. 12, Difh=dl+dr+dh, Difl=dl and Difr=dr. Here, du is the absolute value of the difference between the pixel data at (i, j) and the pixel data at (i−2, j) in the common plane illustrated in FIG. 11, dd is the absolute value of the difference between the pixel data at (i, j) and the pixel data (i+2, j) in the common plane illustrated in FIG. 11, dv is the absolute value of the difference between the pixel data at (i−1, j) and the pixel data at (i+1, j) in the common plane illustrated in FIG. 11. Further, dl is the absolute value of the difference between the pixel data at (i, j) and the pixel data at (i, j−4) in the common plane illustrated in FIG. 12, dr is the absolute value of the difference between the pixel data at (i, j) and the pixel data at (i, j+4) in the common plane illustrated in FIG. 12, and dh is the absolute value of the difference between the pixel data at (i, j−2) and the pixel data at (i, j+2) in the common plane illustrated in FIG. 12.

Figure 13:
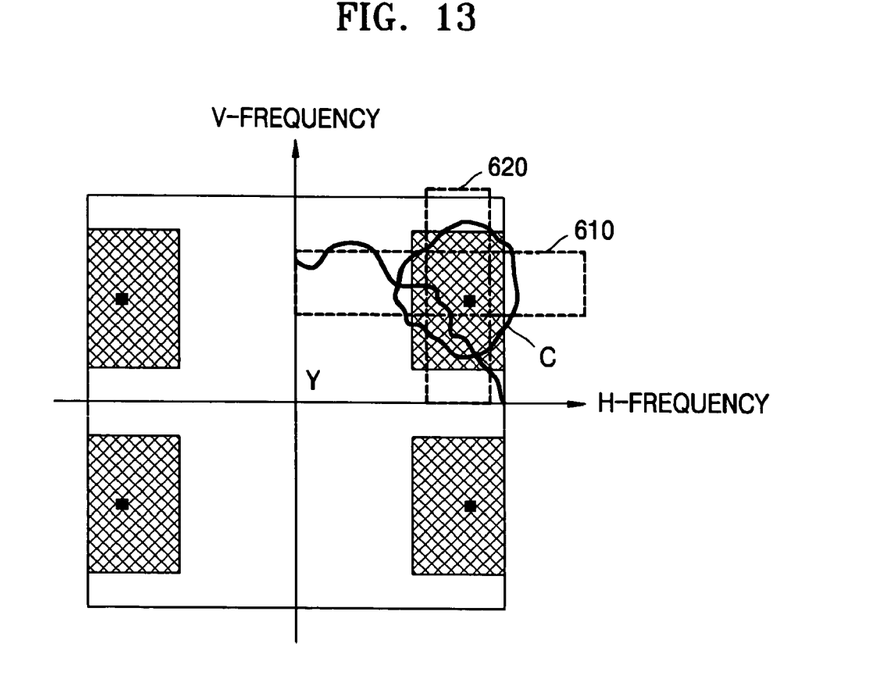
FIG. 13 illustrates spectrum characteristics representing Y and C components with respect to horizontal and vertical frequencies of a video signal.

Accordingly, in spectrum characteristics with respect to horizontal and vertical frequencies H and V, illustrated in FIG. 13, the 2D color compensator 340 compensates the signal $C_1$ output from the Y/C separator 320 via the comparator 330 in the horizontal direction 610 and the vertical direction 620. Thus, the C component is sharply extracted, removing cross-color error in the horizontal and vertical frequencies.

The 2D color compensator 340 outputs the spatially compensated signal $C_s$ to the 3D color compensator 350. The 3D color compensator 350 may determine a spatially and temporally compensated signal $C_2$ as follows:

NTSC: $C_2(i,j,t)=Wc*C_s(i,j,t)+Wb*C_s(i\pm1,j,t-1)+$
$Wf*C_s(i\mp1,j,t+1)Cs(i+-1,j,t-1)\rightarrow Cs(i+-1,j,t-2)$
$Cs(i-+1,j,t+1)\rightarrow Cs(i-+1,j,t+2)$ [Equation 8]

PAL: $C_2(i,j,t)=Wc*C_s(i,j,t)+Wb*C_s(i+1,j,t-1)+Wf*C_s$
$(i-1,j,t+1)Cs(i+1,,\quad j,t-1)\rightarrow Cs(i+1,\quad j,t-2)$
$Cs(i-1,,j,t+1)\rightarrow Cs(i-1,j,t+2)$ [Equation 9]

Weighting value Wb is proportional to a correlation between a central pixel of the current field and a pixel which has the same phase in the frame before the current field. Weighting value Wf is proportional to a correlation between the central pixel of the current field and a pixel which has the same phase in the frame after the current field. Weighting value Wc is a normalization value used to ensure the sum of all the coefficients Wf, Wb and Wc is 1. For example, Wc may be set to 0.5. The temporal weights may be determined by the 3D weighting value determiner 380 with reference to different data output from the memory 310 for the respective NTSC and PAL systems.

Thus, for the NTSC system, as illustrated in FIG. 6, the weighting value Wc may be applied to a current pixel, the weighting value Wb may be applied to a pixel located one horizontal scan line above or below the current pixel in a previous frame and the weighting value Wf may be applied to a pixel located one horizontal scan line below or above the current pixel in a subsequent frame.

Figure 14:
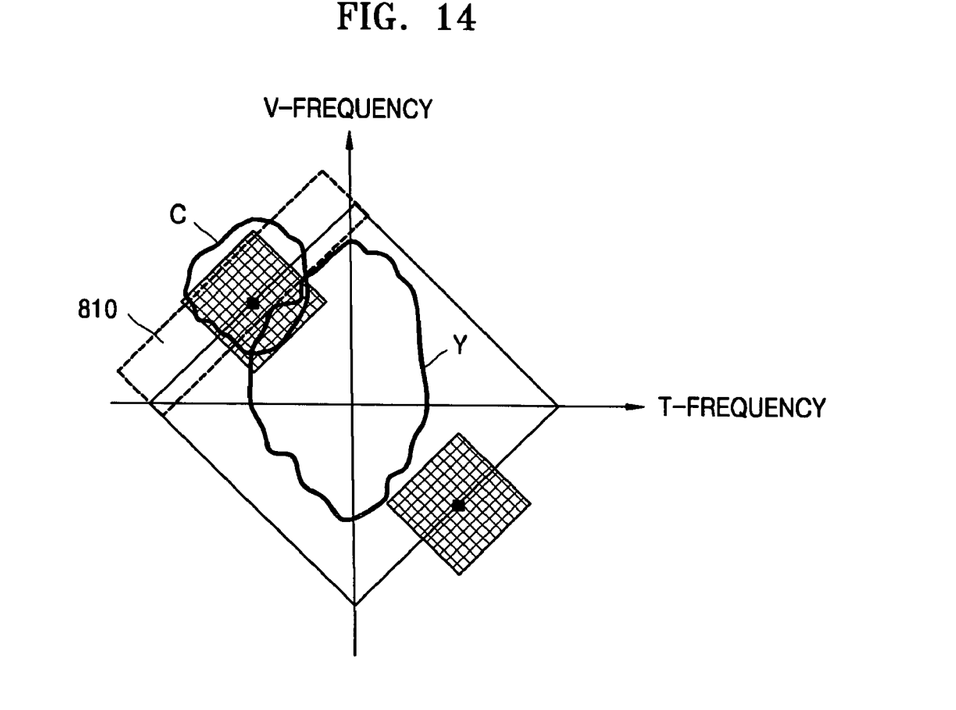
FIG. 14 illustrates spectrum characteristics representing Y and C components with respect to temporal and vertical frequencies of a video signal.

Accordingly, in spectrum characteristics with respect to horizontal and vertical frequencies V and T, illustrated in FIG. 14, the 3D color compensator 350 compensates the signal Cs output from the 2D color compensator 340 in the temporal direction 810. Thus, the C component is sharply extracted, removing cross-color error in the temporal frequency, thus now for all three directions.

While used in the description above, the comparator is not required in the system, and all C signals output from the Y/C separator may be compensated, although this may not result in the most efficient use of resources. Further, compensation may occur only in one of the two spatial directions, i.e., collapsing the matrices of Equations 4 and 5 to one dimensional matrix in either situation, and/or may not include the temporal compensation of the 3D compensator 350. Finally, if desired, the spatially and/or temporally compensated chrominance signal $C_s$ or $C_2$ may be subtracted from the input vide signal to output a compensated luminance signal.

In accordance with the present invention, even if the Y/C separator 320 does not sufficiently remove a luminance component present in a chrominance signal, the 2D and/or 3D color compensators of the present invention may further reduce or remove any remaining luminance component. Accordingly, artifacts such as cross-color may be reduced or removed when the video signal processing apparatus of the present invention is applied to a display system, resulting in improved image quality.

Exemplary embodiments of the present invention have been disclosed herein, and although specific terms are employed, they are used and are to be interpreted in a generic and descriptive sense only and not for purpose of limitation. For example, while embodiments of the present invention has been described relative to a hardware implementation, the processing of present may be implemented in software, e.g., by an article of manufacture having a machine-accessible medium including data that, when accessed by a machine, cause the machine to compensate the C component. Accordingly, it will be understood by those of ordinary skill in the art that various changes in form and details may be made without departing from the spirit and scope of the present invention as set forth in the following claims.

What is claimed is:

1. A method for processing a video signal, comprising:
using a processor to perform:
receiving a C signal separated from an input video signal which is a composite of a Y signal and the C signal; and
compensating the C signal in at least one dimension by using weight coefficients calculated according to spatio-temporal local characteristics of the input video signal.

2. The method as claimed in claim 1, further comprising using the processor to perform:
determining whether a portion of a Y signal of the input video signal is present in the C signal; and
performing compensating only when a portion of the Y signal is present in the C signal.

3. The method as claimed in claim 2, wherein determining includes comparing the C signal with a threshold.

4. The method as claimed in claim 3, wherein comparing includes:
calculating a variation between current C data of the input video signal and adjacent C data; and
comparing the variation to the threshold.

5. The method as claimed in claim 4, wherein the adjacent C data are temporally adjacent to the current C data.

6. The method as claimed in claim 4, wherein the adjacent C data are spatially adjacent to the current C data.

7. The method as claimed in claim 4, wherein the adjacent C data are both temporally and spatially adjacent to the current C data.

8. The method as claimed in claim 1, wherein compensating the C signal further comprises generating a spatially compensated signal $C_s$.

9. The method as claimed in claim 8, wherein generating the spatially compensated signal $C_s$ comprises:
calculating coefficients for a filter from spatial weight coefficients;
structuring the spatial weight coefficients in the filter in accordance with a format of the input video signal; and
convoluting the C signal with the filter.

10. The method as claimed in claim 9, wherein the spatial weight coefficients are 2D weight coefficients.

11. The method as claimed in claim 10, wherein the 2D weight coefficients comprise:
- a first coefficient proportional to vertical and upward correlations with a current pixel;
- a second coefficient proportional to vertical and downward correlations with the current pixel;
- a third coefficient proportional to horizontal and leftward correlations with the current pixel; and
- a fourth coefficient proportional to horizontal and rightward correlations with the current pixel.

12. The method as claimed in claim 10, wherein convoluting comprises using data in the C signal having a same phase as that of a current pixel.

13. The method as claimed in claim 10, wherein, when the input video signal is for use in a PAL system, structuring the 2D weight coefficients includes forming a symmetric matrix.

14. The method as claimed in claim 8, wherein compensating for the C signal further comprises generating a spatially and temporally compensated signal $C_2$ from the spatially compensated signal $C_s$.

15. The method as claimed in claim 14, wherein generating the spatially and temporally compensated signal $C_2$ comprises convoluting the spatially compensated signal $C_s$ with a temporal filter.

16. The method as claimed in claim 15, further comprising forming the temporal filter by calculating a backward weight Wb and a forward weight Wf from the input video signal, a preceding video signal and a following video signal, respectively.

17. The method as claimed in claim 16, wherein the backward weight Wb is proportional to a correlation between a current pixel and a corresponding pixel in a preceding field and the forward weight Wf is proportional to a correlation between the current pixel and a corresponding pixel in a following field.

18. The method as claimed in claim 16, wherein generating the spatially and temporally compensated signal $C_2$ further comprises:
- multiplying data of a current pixel with a current weight Wc;
- multiplying data of a preceding pixel with backward weight Wb;
- multiplying data of a following pixel with forward weight Wf, where Wc+Wb+Wf=1; and
- adding results of the multiplying.

19. The method as claimed in claim 15, further comprises subtracting the $C_2$ signal from the input video signal.

20. An article of manufacture having a non-transitory processor-accessible medium including data s that, when accessed by a processor, causes the processor to:
- separate an input video signal into a Y signal and a C signal; and
- compensate the C signal in at least one dimension by using weight coefficients calculated according to spatio-temporal local characteristics of the input vide signal.

21. A video signal processing apparatus, comprising:
- a weighted value determiner configured to generate weight coefficients according to spatio-temporal local characteristics of an input video signal; and
- a compensator configured to receive a C signal separated from the input video signal, which is a composite of a Y signal and the C signal, and to compensate the C signal in at least one dimension thereof by using weight coefficients output from the weighting value determiner to generate a compensated C signal.

22. The apparatus as claimed in claim 21, further comprising a comparator to determine whether a portion of a Y signal of the input video signal is present in the C signal, the compensator compensating the C signal only when the comparator determines a portion of the Y signal is present in the C signal.

23. The apparatus as claimed in claim 22, wherein the comparator:
- calculates a variation between current C data of the input video signal and adjacent C data; and
- compares the variation to a threshold value.

24. The apparatus as claimed in claim 23, wherein the adjacent C data are temporally adjacent to the current C data.

25. The apparatus as claimed in claim 23, wherein the adjacent C data are spatially adjacent to the current C data.

26. The apparatus as claimed in claim 23, wherein the adjacent C data are both temporally and spatially adjacent to the current C data.

27. The apparatus as claimed in claim 21, wherein the compensator comprises a spatial compensator to generate a spatially compensated signal Cs.

28. The method as claimed in claim 27, wherein the spatial compensator comprises a 2D filter to convolute spatial weight coefficients with the C signal.

29. The apparatus as claimed in claim 28, wherein the spatial weight coefficients are 2D weight coefficients.

30. The apparatus as claimed in claim 29, wherein the 2D weight coefficients comprise:
- a first coefficient proportional to vertical and upward correlations with a current pixel;
- a second coefficient proportional to vertical and downward correlations with the current pixel;
- a third coefficient proportional to horizontal and leftward correlations with the current pixel; and
- a fourth coefficient proportional to horizontal and rightward correlations with the current pixel.

31. The apparatus as claimed in claim 29, wherein convoluting comprises using data in the C signal having a same phase as that of a current pixel.

32. The apparatus as claimed in claim 29, wherein, when the input video signal is for use in a PAL system, the 2D filter includes the 2D weight coefficients in a symmetric matrix.

33. The apparatus as apparatus in claim 28, wherein the compensator further comprises a temporal compensator.

34. The apparatus as claimed in claim 33, wherein the temporal compensator comprises a temporal filter to convolute with the spatially compensated signal Cs.

35. The apparatus as claimed in claim 34, wherein the temporal filter includes a backward weight Wb and a forward weight Wf from the input video signal, a preceding video signal and a following video signal, respectively.

36. The apparatus as claimed in claim 35, wherein the backward weight Wb is proportional to a correlation between a current pixel and a corresponding pixel in a preceding field and the forward weight Wf is proportional to a correlation between the current pixel and a corresponding pixel in a following field.

37. The apparatus as claimed in claim 35, wherein the temporal filter combines a current value multiplied by a current weight Wc, a preceding value multiplied by Wb and a future value multiplied by Wf, where Wc+Wb+Wf=1.

* * * * *